P. C. DONNER.
ART OF CARROTING FUR.
APPLICATION FILED MAR. 17, 1914.
1,106,371.
Patented Aug. 11, 1914.
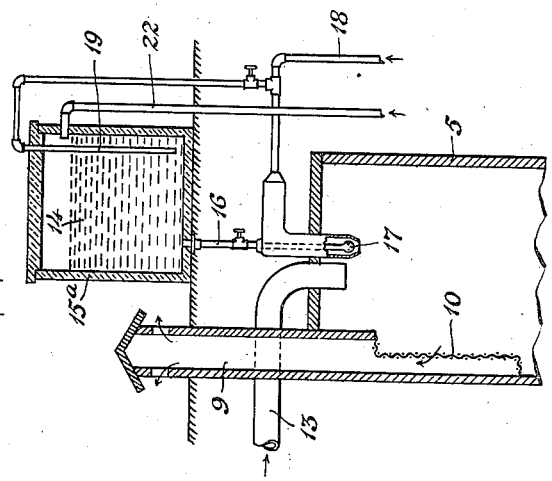
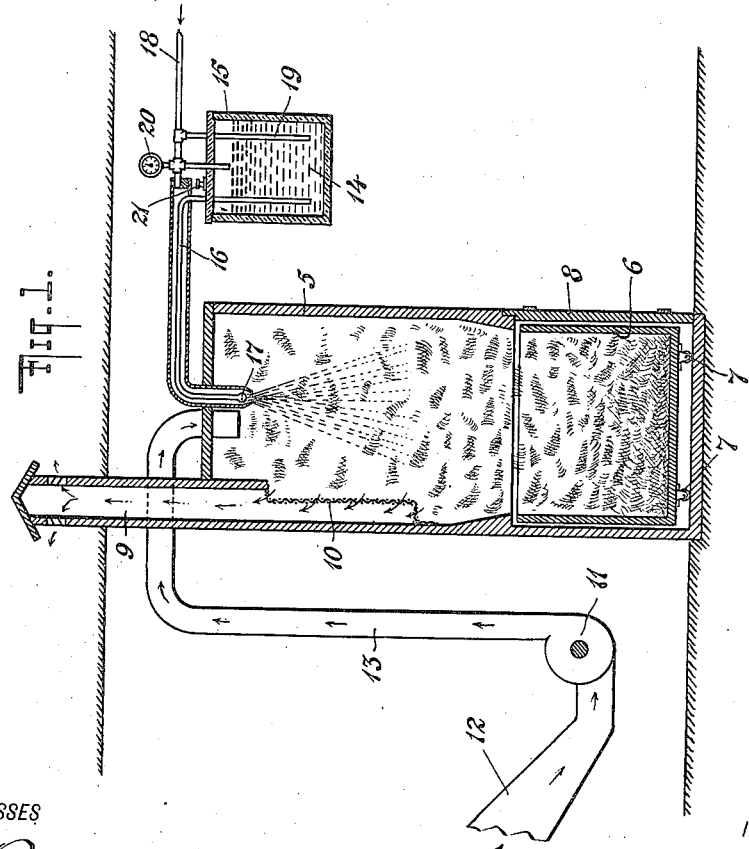
WITNESSES
G. V. Rasmussen
John A. Schlenker
INVENTOR
PHILIP C. DONNER
BY
Briesen & Knauth
ATTORNEYS

UNITED STATES PATENT OFFICE.

PHILIP C. DONNER, OF SUMMIT, NEW JERSEY.

ART OF CARROTING FUR.

1,106,371. Specification of Letters Patent. Patented Aug. 11, 1914.

Application filed March 17, 1914. Serial No. 825,287.

*To all whom it may concern:*

Be it known that I, PHILIP C. DONNER, a citizen of the United States, and a resident of Summit, county of Union, State of New Jersey, have invented certain new and useful Improvements in the Art of Carroting Fur, of which the following is a specification.

My invention relates to the art of carroting fur and has for an object to provide a simple process for applying a suitable carroting solution to cut raw fur in such a manner as to permit a solution of increased strength to be used without injury to the fiber of the fur, whereby the fur is treated in a maximumly effective manner, and matter which heretofore has been considered as waste may be advantageously utilized.

A further object of my improvement is the provision of a simple and efficient apparatus for carrying out my improved process.

My invention will be fully described hereinafter and the features of novelty will be pointed out in the appended claims.

Reference is to be had to the accompanying drawings which illustrate examples of my apparatus and in which—

Figure 1 is a diagrammatic sectional view of one form and Fig. 2 is a similar detail view of a slightly different structure.

The apparatus as shown in Fig. 1 comprises a closed receptacle or chamber 5 in the bottom of which is located a carrier 6 preferably mounted on wheels 7 so as to be easily manipulated, a suitable opening, arranged to be closed by a door 8, being provided through which said carrier may be moved into and out of the receptacle 5. In its upper wall the receptacle 5 is provided with a stack 9 which, at its upper end, communicates with the atmosphere and has its lower end located within the receptacle 5 and preferably covered by a screen or similar device 10. A blower 11 has its inlet end connected with a source of supply of cut raw fur or with a hopper or the like 12 adapted to contain such cut raw fur and has its exit end connected with a pipe 13 which extends through the upper wall of the receptacle 5 and terminates interiorly thereof near the top, and through which the cut raw fur may be blown into the receptacle 5. The carroting solution 14 is contained in a container 15, suitably supported, and connected with the receptacle 5 by means of a tube 16 terminating in a nozzle 17 within the upper portion of said receptacle 5, an air pipe 18 connected with a source of compressed air having its one end located interiorly of said receptacle 5, adjacent to the nozzle 17 and forming therewith a spraying device, whereby the solution 14 may be sprayed into the interior of the receptacle 5 to form a mist therein. A branch 19 may if desired extend from the pipe 18 into the solution 14 whereby air is forced into the same for the purpose of agitating said solution, and a pressure indicator 20 of any desired type may also be connected with said pipe 18 to indicate the air pressure therein. In addition to this I prefer to provide the container 15 with a safety valve 21 to permit any gases which may be formed beyond a predetermined pressure to escape therefrom.

In utilizing the apparatus so far described in carrying out my improved process the raw cut fur passes from the hopper 12 or other source of supply to the blower 11 and is blown by the latter through the pipe 13 into the upper portion of the receptacle 5 from which point it distributes itself throughout the interior of said receptacle, traveling lengthwise thereof, and finally drops into the carrier 6. At the same time the carroting solution passes through the pipe 16 and under the influence of the compressed air flowing from the tube 18 is sprayed through the nozzle 17 into said receptacle 5 into contact with the cut fur distributed therein by the blower 11. This cut fur in its passage to the carrier 6 in this manner subjected to the action of the carroting solution, that is, chemically changed so that the animal grease is in this manner removed from the fiber of the fur. The screen 10 permits air and other gases to pass out of the stack 9 while preventing the cut fur from escaping.

During the operation of my improved apparatus the solution 14 may be continuously agitated by the air passing through the branch 19 and thereby maintained in a proper effective condition at all times.

With my improved process a much stronger carroting solution may be used than formerly and all portions of the cut fur receive a maximumly effective treatment, thus making it possible to advantageously utilize material which heretofore has been regarded as waste having no special value.

In the form of my apparatus shown in Fig. 2 the container 15$^a$ for the solution 14 is located at a higher level than the receptacle 5 so that the pressure of gravity is added to the air pressure in reducing the said solution to a spray as it enters the said receptacle 5. Otherwise this form of apparatus may be the same and operate the same as the form shown in Fig. 1. In each case when the carrier 6 has become filled with treated cut fur the door 8 may be opened to permit said carrier to be removed from the receptacle 5 and emptied and then returned for a new supply, or a second empty carrier may immediately be introduced into said receptacle in order that an interruption of the process may be avoided while the first carrier is being relieved of its contents. It will, of course, be understood that a suitable means for introducing the solution 14 into the container 15 or 15ª is provided, for instance in the shape of a pipe 22, Fig. 2 connected with a source of such solution.

It will further be evident that other types of apparatus may be utilized to carry out my process and also that various changes in the specific forms shown and described and in the process described may be made within the scope of the claims without departing from the spirit of my invention.

I claim:

1. An improvement in the art of carroting fur which consists in distributing cut raw fur about in an inclosed space and providing a mist of carroting solution in said space in the presence of said fur.

2. An improvement in the art of carroting fur which consists in blowing cut raw fur into a receptacle at the top and spraying a carroting solution into said receptacle into contact with the moving fur therein.

3. An improvement in the art of carroting fur which consists in blowing cut raw fur into a receptacle at the top and spraying a carroting solution into said receptacle at the top into contact with the moving fur therein.

4. An improvement in the art of carroting fur which consists in distributing cut raw fur about in a receptacle and causing said distributed cut raw fur to travel lengthwise of said receptacle and spraying a carroting solution into said receptacle into contact with the moving fur therein.

5. An apparatus for carroting fur comprising a chamber adapted to confine a moving distributed mass of cut raw fur and means for producing a mist of carroting solution in said chamber.

6. An apparatus for carroting fur comprising a chamber, means for distributing cut raw fur about in said chamber and causing said distributed cut raw fur to move lengthwise thereof and means for producing a mist of carroting solution in said chamber, in contact with said fur.

7. An apparatus for carroting fur comprising a chamber, means for blowing cut raw fur into said chamber and means for spraying a carroting solution into said chamber into contact with the moving fur therein.

8. An apparatus for carroting fur comprising a chamber, means for blowing cut raw fur into said chamber at the top and means for spraying a carroting solution into said chamber at the top into contact with the moving fur therein.

9. An apparatus for carroting fur comprising a chamber, a blower, a connection from the inlet of said blower to a source of supply of cut raw fur, a conduit connected with the outlet of said blower and with the interior of said chamber through which the cut raw fur is blown into the latter, a container for a carroting solution, a tube connecting said container with the interior of said chamber and a pipe connected with a source of compressed air and extending into said chamber in proximity to said tube and forming therewith a means for reducing the carroting solution to a spray in said chamber.

10. An apparatus for carroting fur comprising a chamber, a blower, a connection from the inlet of said blower to a source of supply of cut raw fur, a conduit connected with the outlet of said blower and with the interior of said chamber through which the cut raw fur is blown into the latter, a container for a carroting solution, a tube connecting said container with the interior of said chamber, a pipe connected with a source of compressed air and extending into said chamber in proximity to said tube and forming therewith a means for reducing the carroting solution to a spray in said chamber and a connection from said pipe to said container whereby compressed air is introduced into the latter to agitate the solution therein.

In testimony whereof I have hereunto set my hand in the presence of two subscribing witnesses.

PHILIP C. DONNER.

Witnesses:
JOHN A. KEHLENBECK,
FRITZ ZIEGLER, Jr.